(12) United States Patent
Smithies et al.

(10) Patent No.: US 8,308,834 B2
(45) Date of Patent: *Nov. 13, 2012

(54) COMPOSITE FILTER MEDIA

(75) Inventors: Alan Smithies, Overland Park, KS (US); Jack T. Clements, Lee's Summitt, MO (US); David Charles Jones, Midlothian, VA (US); Hyun Sung Lim, Midlothian, VA (US)

(73) Assignee: BHA Group, Inc., Wilmington, DE (US)

( * ) Notice: Subject to any disclaimer, the term of this patent is extended or adjusted under 35 U.S.C. 154(b) by 188 days.

This patent is subject to a terminal disclaimer.

(21) Appl. No.: 12/184,577

(22) Filed: Aug. 1, 2008

(65) Prior Publication Data

US 2008/0314010 A1    Dec. 25, 2008

Related U.S. Application Data

(63) Continuation-in-part of application No. 11/843,228, filed on Aug. 22, 2007.

(60) Provisional application No. 60/893,008, filed on Mar. 5, 2007.

(51) Int. Cl.
*B01D 46/00* (2006.01)

(52) U.S. Cl. ............... 55/487; 55/486; 55/528

(58) Field of Classification Search ........... 55/486, 55/487, 527, 528
See application file for complete search history.

(56) References Cited

U.S. PATENT DOCUMENTS

| | | | |
|---|---|---|---|
| 4,650,506 A * | 3/1987 | Barris et al. ............... | 55/487 |
| 5,364,456 A | 11/1994 | Kahlbaugh et al. | |
| 5,437,910 A | 8/1995 | Raabe et al. | |
| 5,667,562 A * | 9/1997 | Midkiff ............... | 96/15 |
| 6,110,249 A * | 8/2000 | Medcalf et al. ............... | 55/514 |
| 6,165,572 A | 12/2000 | Kahlbaugh et al. | |
| 6,274,521 B1 | 8/2001 | Barbier et al. | |
| 6,315,806 B1 | 11/2001 | Torobin et al. | |
| 6,368,386 B1 | 4/2002 | Nelson et al. | |
| 6,395,048 B1 | 5/2002 | Yoder et al. | |
| 6,485,811 B1 | 11/2002 | Horiguchi et al. | |
| 6,656,400 B2 | 12/2003 | Veeser et al. | |
| 6,673,136 B2 | 1/2004 | Gallingham et al. | |
| 6,706,086 B2 | 3/2004 | Emig et al. | |

(Continued)

FOREIGN PATENT DOCUMENTS

DE    4137627 A1    11/1991

(Continued)

OTHER PUBLICATIONS

ANSI/ASHRAE Standard 52.2—1999; Method of Testing General Ventilation Air-Cleaning Devices for Removal Efficiency by Particle Size (48 pages); 1999.

(Continued)

*Primary Examiner* — Robert Clemente

(74) *Attorney, Agent, or Firm* — Armstrong Teasdale LLP

(57) ABSTRACT

A composite filter media structure includes, in an exemplary embodiment, a base substrate that includes a nonwoven synthetic fabric formed from a plurality of fibers with a spunbond process. The base substrate has a minimum filtration efficiency of about 50%, measured in accordance with ASHRAE 52.2-1999 test procedure A nanofiber layer is deposited on one side of the base substrate. The composite filter media structure has a minimum filtration efficiency of about 75%, measured in accordance with ASHRAE 52.2-1999 test procedure.

26 Claims, 7 Drawing Sheets

U.S. PATENT DOCUMENTS

| | | | |
|---|---|---|---|
| 6,716,274 B2 | 4/2004 | Gogins et al. | |
| 6,740,142 B2 | 5/2004 | Buettner et al. | |
| 6,743,273 B2 | 6/2004 | Chung et al. | |
| 6,746,517 B2 | 6/2004 | Benson et al. | |
| 6,800,117 B2 | 10/2004 | Barris et al. | |
| 6,858,057 B2 * | 2/2005 | Healey | 55/528 |
| 6,872,311 B2 * | 3/2005 | Koslow | 210/502.1 |
| 6,875,256 B2 | 4/2005 | Gillingham et al. | |
| 6,924,028 B2 | 8/2005 | Chung et al. | |
| 6,994,742 B2 | 2/2006 | Barris et al. | |
| 7,008,465 B2 | 3/2006 | Graham et al. | |
| 7,090,715 B2 | 8/2006 | Chung et al. | |
| 7,235,122 B2 * | 6/2007 | Bryner et al. | 95/287 |
| 2004/0060268 A1 | 4/2004 | Chung et al. | |
| 2004/0131820 A1 | 7/2004 | Turner et al. | |
| 2004/0255783 A1 | 12/2004 | Graham et al. | |
| 2005/0067732 A1 | 3/2005 | Kim et al. | |
| 2005/0235619 A1 * | 10/2005 | Heinz et al. | 55/486 |
| 2006/0089072 A1 | 4/2006 | Baker et al. | |
| 2006/0137317 A1 * | 6/2006 | Bryner et al. | 55/528 |
| 2007/0084786 A1 * | 4/2007 | Smithies | 210/490 |
| 2008/0113573 A1 | 5/2008 | Acosta et al. | |
| 2008/0134652 A1 * | 6/2008 | Lim et al. | 55/486 |
| 2008/0302072 A1 * | 12/2008 | Hassmann et al. | 55/486 |
| 2008/0315465 A1 | 12/2008 | Smithies et al. | |

FOREIGN PATENT DOCUMENTS

| | | |
|---|---|---|
| EP | 1970111 A1 | 9/2008 |
| GB | 1117900 A1 | 6/1968 |
| GB | 1376888 A1 | 12/1974 |
| JP | 8209489 A1 | 2/1995 |
| WO | 9911355 A1 | 3/1999 |
| WO | 03080905 A1 | 10/2003 |
| WO | 2004018079 A2 | 3/2004 |
| WO | 2004069378 A2 | 8/2004 |
| WO | 2006071979 A1 | 7/2006 |
| WO | 2009085679 A1 | 7/2009 |

OTHER PUBLICATIONS

International Search Report of the Intellectual Property Office dated Nov. 2, 2009 regarding application No. GB0912148.4; 2 pages.

International Search Report mailed Nov. 25, 2009 regarding GB09113172.3 application; 4 pages.

High efficiency air filters (HEPA and ULPA); Article; Apr. 1998; 130 pages; European Standards (EN 1822-1).

GB Office Action dated Jan. 23, 2012 from corresponding Application No. GB0913266.3.

* cited by examiner under filters produced from a wet-laid paper making process to produce the substrate, and an electro-spun technology to deposit a lightweight nanofiber coating on one or both sides of the filter media substrate. Typically the media substrate has a basis weight of 100-120 grams per square meter (g/m²), and the nanofiber layer has a basis weight of 0.1 g/m² or less.

COMPOSITE FILTER MEDIA

CROSS REFERENCE TO RELATED APPLICATIONS

This application is a continuation-in-part of U.S. patent application Ser. No. 11/843,228, filed Aug. 22, 2007, which claims priority to Provisional Patent Application Ser. No. 60/893,008, filed Mar. 5, 2007.

BACKGROUND OF THE INVENTION

The field of the invention relates generally to a composite nonwoven filter media, and more particularly, to a spunbond nonwoven filter media having a nanofiber based layer applied to at least one surface.

Some known filter media composite constructs incorporate a wet-laid paper making process to produce the substrate, and an electro-spun technology to deposit a lightweight nanofiber coating on one or both sides of the filter media substrate. Typically the media substrate has a basis weight of 100-120 grams per square meter (g/m²), and the nanofiber layer has a basis weight of 0.1 g/m² or less.

It is known that the lightweight nanofiber layer is vulnerable to damage in high mechanical stress applications, especially because the nanofiber layer is formed from fibers with diameters less than 500 nanometer (nm), and more typically, 100 nm. It is known that there are "shedding" problems where the nanofibers are shed from the filter media because of relatively weak attraction bonds between the nanofibers and the base media for conventional electro-spun fibers that rely on polarity attraction forces. Also, known electro-spun nanofiber layers are two dimensional in structure or a single fiber layer in thickness, and when the nanofiber layer cracks or breaks, dust can readily penetrate the base media substrate After the nanofiber layer is damaged, dust is permitted to penetrate the base media and contribute to a rise in the operating pressure drop of the filter. Further, known media substrates also have mechanical stress limitations and are prone to deformation under high dust loading.

These known filter media composite constructs when used to filter inlet air of power generation gas turbines can permit fine dust particulates to penetrate the filter over the operating life of the filter. Typically, this known filter media type will have a new or clean operating electrically neutral efficiency providing for around 55% of capture of 0.4 μm particles, at a pressure drop typically greater than 7.0 mm H₂O, and a Quality Factor less than 300, when tested in accordance with the ASHRAE 52.2-1999 test procedure at the known operating flow rate. It is known that as much as 15 to 20 pounds of dust can penetrate known filter media over a 24,000 hour operating life because of this low initial efficiency. Exposing the turbine blades to dust over an extended time can cause serious and catastrophic fouling and erosion of the turbine blades. The current procedure of cleaning the turbine blades requires taking the turbine off-line at periodic intervals to water wash the blades clean. Turbine down time is expensive because the turbine is not operating and therefore, power generation is curtailed. It would be desirable to provide a higher efficiency filter media than the known filter media at a similar or reduced pressure drop to reduce or eliminate turbine down time to clean the turbine blades and/or the replacement of damaged blades.

BRIEF DESCRIPTION OF THE INVENTION

In one aspect, a composite filter media structure is provided. The composite filter media structure includes a base substrate that includes a nonwoven synthetic fabric formed from a plurality of fibers with a spunbond process. The base substrate has a minimum filtration efficiency of about 50%, measured in accordance with ASHRAE 52.2-1999 test procedure A nanofiber layer is deposited on one side of the base substrate. The composite filter media structure has a minimum filtration efficiency of about 75%, measured in accordance with ASHRAE 52.2-1999 test procedure.

In another aspect, a filter element is provided. The filter element includes a first end cap, a second end cap, and a composite filter media structure. The composite filter media structure includes a base substrate that includes a nonwoven synthetic fabric formed from a plurality of fibers with a spunbond process, the base substrate having a minimum filtration efficiency of about 50%, measured in accordance with ASHRAE 52.2-1999 test procedure. A nanofiber layer is deposited on one side of the base substrate. The composite filter media structure has a minimum filtration efficiency of about 75%, measured in accordance with ASHRAE 52.2-1999 test procedure.

DETAILED DESCRIPTION OF THE INVENTION

A composite filter media for filter assemblies is described in detail below. In an exemplary embodiment, the composite filter media includes a media substrate of a synthetic nonwoven fabric that is formed from bicomponent fibers by a unique spunbond process. A nanofiber layer is deposited on at least one side of the media substrate. The composite media provides an initial filtration efficiency of about 75% or greater retained capture of 0.4 μm particles, when tested in accordance with the American Society of Heating, Refrigerating and Air-Conditioning Engineers (ASHRAE) 52.2-1999 test procedure, which is about a 20% increase in performance compared to known filter media. In addition, the composite media provides the 75% efficiency at a greater than 30% lower pressure drop than known filter media. The composite filter media is more durable than known filter media and provides for lower pressure drop build-up because of less deflection of the filter media from the forces exerted on the filter media during the filtering and reverse cleaning operations. The composite filter media may have a quality factor ($Q_f$) of greater than about 450, and in another embodiment, greater than about 500. Also, the composite filter media may have a resistance (or pressure drop) of less than 4.0 mm water, measured in accordance with EN-1822 (1998), with the base media substrate having a resistance of less than about 2.5 mm water, measured in accordance with EN-1822 (1998). Further, the spunbond media substrate is more efficient than known filter media substrates at an equivalent or lower pressure drop. The bicomponent fibers used to form the media substrate are finer than fibers used to form known filter media. Further, the nanofiber membrane layer has a higher basis weight than known filter media which permits the filter media to clean down more effectively under reverse pulse cleaning than known filter media. The high basis weight of the nanofiber layer provides for a durable three dimensional surface filtration layer which has an extensive tortuous path that permits high efficiency and fine particle capture without substantially restricting air flow or increasing pressure drop.

By "quality factor ($Q_f$)" is meant the parameter defined by the equation:

$$Q_f = -25000 \cdot \log(P/100)/\Delta p$$

Where "P"=particle penetration in % and "$\Delta p$"=pressure drop across the media in Pascals.

By "resistance" is meant the resistance (pressure drop) as measured using the test method described in EN 1822 (1998).

Figure 1:
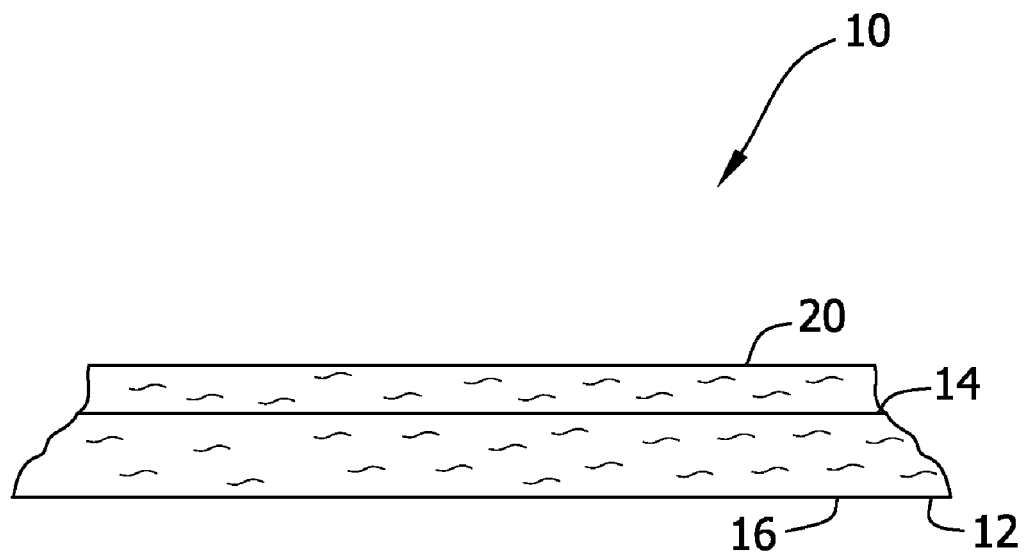
FIG. 1 is cross sectional illustration of an exemplary embodiment of a composite filter media.

Referring to the drawings, FIG. 1 is a sectional illustration of an exemplary embodiment of a filter media 10. Filter media 10 includes a base media substrate 12 having a first side 14 and a second side 16. A nanofiber layer 20 is deposited onto first side 14 of media substrate. In another embodiment, nanofiber layer 20 is deposited onto second side 16, and in another embodiment, nanofiber layer 20 is deposited on each of first and second sides 14 and 16.

Figure 2:
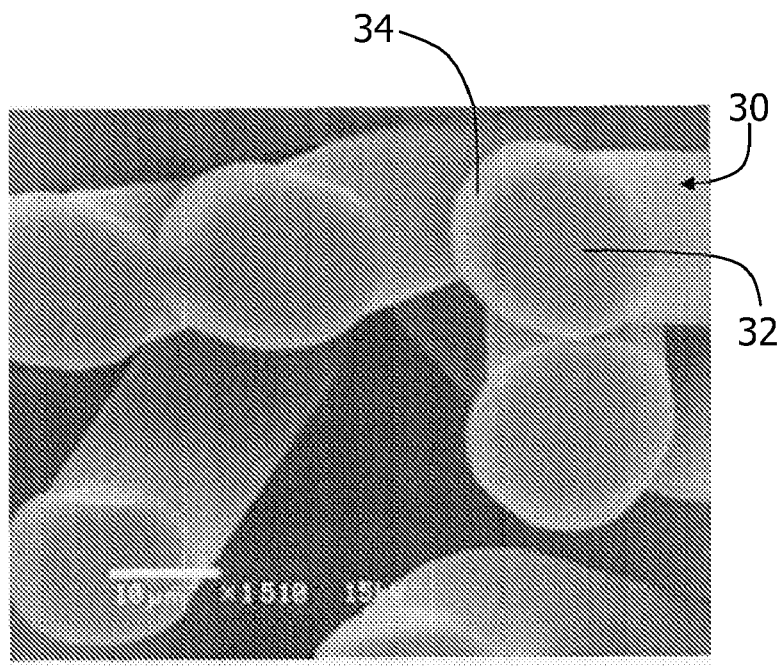
FIG. 2 is a photomicrograph of the bicomponent fibers shown in FIG. 1.
Figure 3:
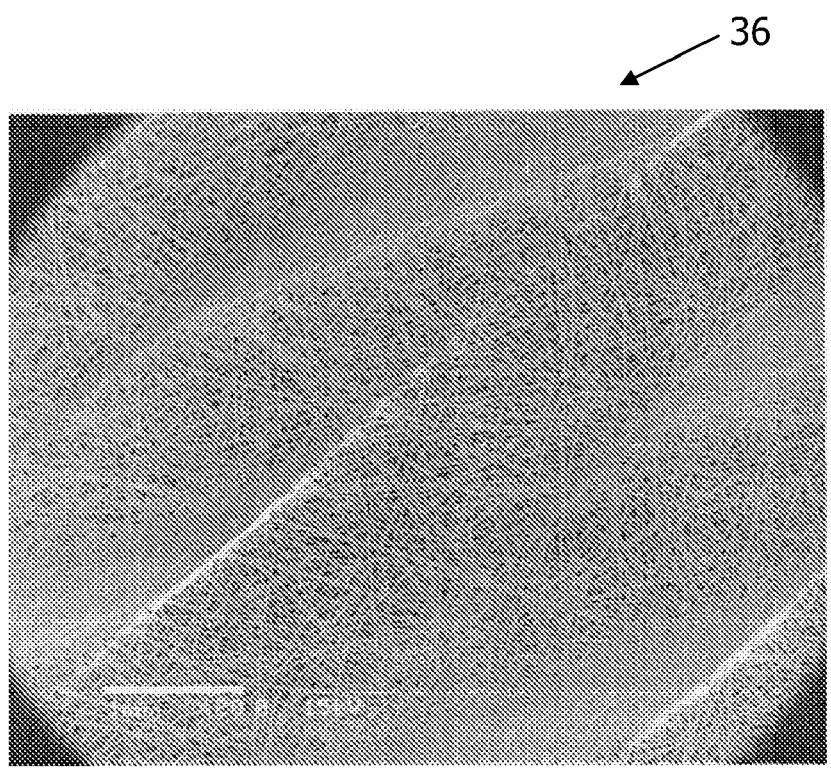
FIG. 3 is a photomicrograph of the base media substrate shown in FIG. 1.

Media substrate 12 is a nonwoven fabric formed from synthetic bicomponent fibers using a spunbond process. The nonwoven fabric includes bicomponent fibers having a thermoplastic fiber component added to the nonwoven fabric during its production. Suitable bicomponent fibers are fibers having a core-sheath structure, an island structure or a side-by-side structure. Referring also to FIG. 2, in the exemplary embodiment, a bicomponent fiber 30 includes a core 32 and a sheath 34 circumferentially surrounding core 32. Bicomponent fibers 30 are meltspun through jets into a plurality of continuous fibers which are uniformly deposited into a random three dimensional web. The web is then heated and embossed calendered which thermally bonds the web into a consolidated spunbond fabric 36, shown in FIG. 3. Heat from contact of the calender roll embossing pattern softens or melts the thermoplastic sheath 34 of bicomponent fibers 30 which binds the nonwoven fibers together at the contact points of calender roll embossing pattern. The temperature is selected so that at least softening or fusing of the lower melting point sheath 34 portion of bicomponent fibers 30 occurs. In one embodiment, the temperature is about 90° C. to about 240° C. The desired connection of the fibers is caused by the melting and re-solidification of sheath portion 34 after cooling.

Bicomponent fibers 30 have diameter of about 12 microns to about 18 microns which is finer than the known fibers used in traditional and common spunbond products. A unique aspect of base media substrate 12 is the bond pattern used to consolidate spunbond base media 12. The bond pattern is defined by the embossing pattern of the calender rolls. Traditional spunbond media used in filtration have a bond area (land area) of around 19 to 24 percent. The bond area provides for media durability and function while at the same time the bond points create areas of fused polymer that have zero air flow.

Figure 4:
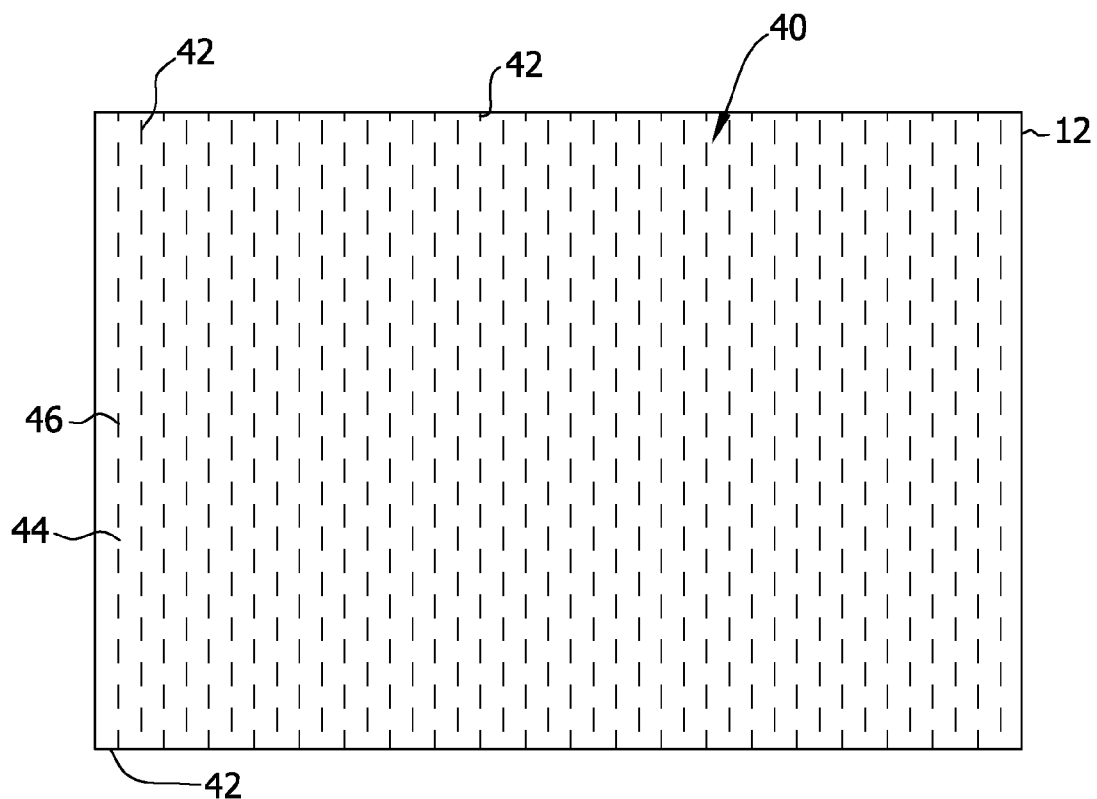
FIG. 4 is a top illustration of the bond pattern of the base media substrate shown in FIG. 1

Referring also to FIG. 4, a bond pattern 40 on base media 12 attains an acceptable durability to base media 12, while allowing more fiber to be available for filtration thus increasing filtration efficiency. Bond pattern 40 includes a plurality of parallel discontinuous lines 42 of bond area extending across base media 12. The parallel discontinuous lines 42 of bond area are off-set from each other so that at a location of no bond area 44 in a discontinuous line 42 is aligned with a bond area 46 of an adjacent discontinuous line 42. The bond area 46 of spunbond bicomponent fibers 30 in media 12 is about 10 percent to about 16 percent of the total area of the fabric as compared to the bond area of about 19 to 24 percent of known spunbond fabrics. The lower bond areas allow for base media 12 to have increase air permeability or inversely low pressure drop when tested at a given air flow. In the exemplary embodiment the basis weight of base media 12 is about 100 g/m² to about 330 g/m², in another embodiment, about 100 g/m² to about 220 g/m².

Any suitable synthetic bicomponent fiber 30 can be used to make the nonwoven fabric of media substrate 12. Suitable materials for core 32 and sheath 34 of bicomponent fiber 30 include, but are not limited to, polyester, polyamide, polyolefin, thermoplastic polyurethane, polyetherimide, polyphenyl ether, polyphenylene sulfide, polysulfone, aramid, and mixtures thereof. Suitable materials for the sheath of the bicomponent fiber include thermoplastic materials that have a lower melting point than the material of the core of the bi-component fiber, for example polyester, polyamide, polyolefin, thermoplastic polyurethane, polyetherimide, polyphenyl ether, polyphenylene sulfide, polysulfone, aramid, and mixtures thereof.

In the exemplary embodiment, nanofiber layer 20 is formed by an electro-blown spinning process that includes feeding a polymer solution into a spinning nozzle, applying a high voltage to the spinning nozzle, and discharging the polymer solution through the spinning nozzle while injecting compressed air into the lower end of the spinning nozzle. The applied high voltage ranges from about 1 kV to about 300 kV. The electro-blown spinning process of forming nanofibers and the unique apparatus used is described in detail in U.S. Patent Application Publication No. 2005/00677332. The electro-blown spinning process provides a durable three dimensional filtration layer of nanofibers that is thicker than known nanofiber filtration layers on known filter media. In the exemplary embodiment the basis weight of nanofiber layer 20 is about 0.6 g/m² to about 20 g/m², in another embodiment, about 2 g/m² to about 20 g/m², in another embodiment, about 5 g/m² to about 10 g/m², in another embodiment, about 1.5 g/m² to about 2.5 g/m². The nanofibers in nanofiber layer 20 have an average diameter of about 500 nm or less.

In alternate embodiments, nanofiber layer 20 may be formed by electrospinning, centrifugal spinning, or melt blowing. Classical electrospinning is a technique described in detail in U.S. Pat. No. 4,127,706. A high voltage is applied to a polymer in solution to create nanofibers and nonwoven mats. However, total throughput in electrospinning processes is too low to be viable in forming heavier basis weight webs. Centrifugal spinning is a fiber forming process that includes supplying a spinning solution having at least one polymer dissolved in at least one solvent to a rotary sprayer having a rotating conical nozzle. The nozzle has a concave inner surface and a forward surface discharge edge. The spinning solution moves through the rotary sprayer along the concave inner surface so as to distribute the spinning solution toward the forward surface of the discharge edge of the nozzle. Separate fibrous streams are formed from the spinning solution while the solvent vaporizes to produce polymeric fibers in the presence or absence of an electrical field. A shaping fluid can flow around the nozzle to direct the spinning solution away from the rotary sprayer. The fibers are collected onto a collector to form a nanofiber web. In addition, melt blowing is described in detail in U.S. Pat. No. 6,520,425.

Media substrate 12 has a high air permeability compared to known filter media which permits improved mechanical adhesion of the nanofibers to media substrate 12. As nanofiber layer 20 is applied to first side 14 of media substrate 12, a vacuum may be applied from second side 16 of media substrate during the electro-blown spinning process to hold the nanofibers on the substrate. In combination with the drying temperatures used in the application of nanofiber layer 12, softening of sheath portion 34 of bicomponent fiber 30 occurs and nanofiber layer 20 is further densified and bonded to spunbond base media substrate 12. In combination with the high air permeability of media substrate 12, the effectiveness of the vacuum becomes more effective which provides for a strong mechanical bond of the nanofibers to the bicomponent fibers of media substrate 12.

Suitable polymers for forming nanofibers by the electro-blown spinning process are not restricted to thermoplastic polymers, and may include thermosetting polymers. Suitable polymers include, but are not limited to, polyimides, polyamides (nylon), polyaramides, polybenzimidazoles, polyetherimides, polyacrylonitriles, polyethylene terephthalate, polypropylene, polyanilines, polyethylene oxides, polyethylene naphthalates, polybutylene terephthalate, styrene butadiene rubber, polystyrene, polyvinyl chloride, polyvinyl alcohol, polyvinylidene chloride, polyvinyl butylene, polyacetal, polyamide, polyester, polyolefins, cellulose ether and ester, polyalkylene sulfide, polyarylene oxide, polysulfone, modified polysulfone polymers, and mixtures thereof. Also, materials that fall within the generic classes of poly (vinylchloride), polymethylmethacrylate (and other acrylic resins), polystyrene, and copolymers thereof (including ABA type block copolymers), poly (vinylidene fluoride), poly (vinylidene chloride), polyvinylalcohol in various degrees of hydrolysis (87% to 99.5%) in crosslinked and non-crosslinked forms may be used and copolymer or derivative compounds thereof. One suitable class of polyamide condensation polymers are nylon materials, such as nylon-6, nylon-6, 6, nylon 6, 6-6, 10, and the like. The polymer solution is prepared by selecting a solvent that dissolves the selected polymers. The polymer solution can be mixed with additives, for example, plasticizers, ultraviolet ray stabilizers, crosslink agents, curing agents, reaction initiators, and the like. Although dissolving the polymers may not require any specific temperature ranges, heating may be needed for assisting the dissolution reaction.

It can be advantageous to add plasticizers to the various polymers described above, in order to reduce the $T_g$ of the fiber polymer. Suitable plasticizers will depend upon the polymer, as well as upon the particular end use of the nanofiber layer. For example, nylon polymers can be plasticized with water or even residual solvent remaining from the electrospinning or electro-blown spinning process. Other plasticizers which can be useful in lowering polymer $T_g$ include, but are not limited to, aliphatic glycols, aromatic sulphanomides, phthalate esters, including but not limited to, dibutyl phthalate, dihexl phthalate, dicyclohexyl phthalate, dioctyl phthalate, diisodecyl phthalate, diundecyl phthalate, didodecanyl phthalate, and diphenyl phthalate, and the like.

Figure 5:
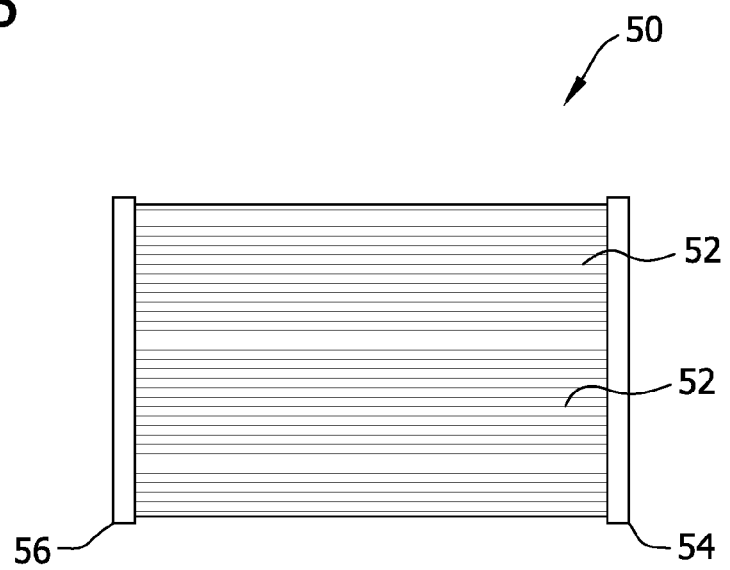
FIG. 5 is a side illustration of a filter cartridge that includes the filter media shown in FIG. 1.
Figure 6:
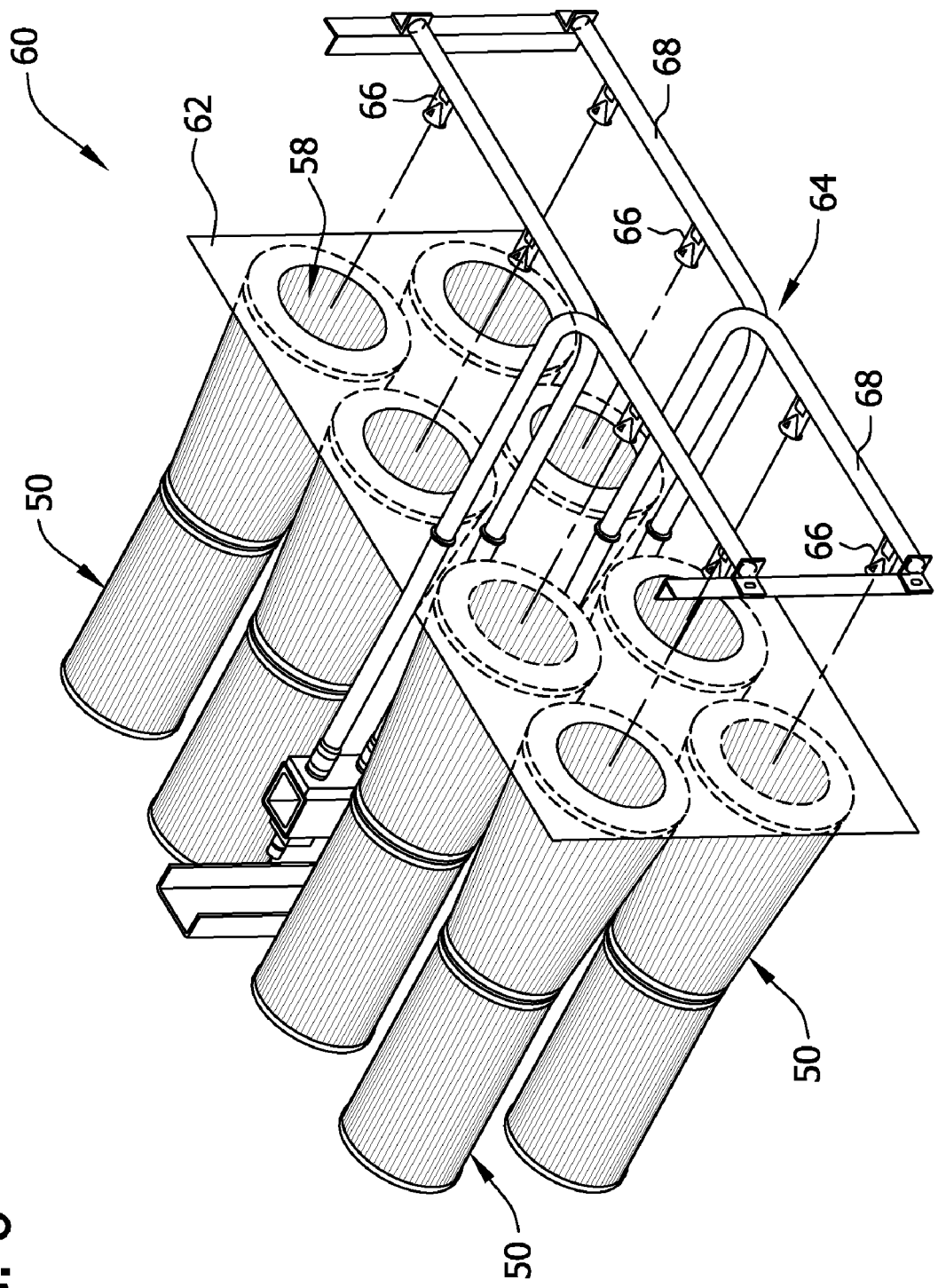
FIG. 6 is a perspective illustration of a filter assembly that includes the filter cartridge shown in FIG. 4.

FIG. 5 is a side illustration of a filter element 50 formed from filter media 10. In the exemplary embodiment, filter media 10 includes a plurality of pleats 52. Filter element 50 includes a first end cap 54 and an opposing second end cap 56 with filter media 10 extending between end caps 54 and 56. Filter element 50 has a tubular shape with an interior conduit 58 (shown in FIG. 6). Filter element 50 is cylindrical in shape, but can also be conical as shown in FIG. 6. Filter element 50 can also include an inner and/or an outer support liner to provide structural integrity of filter element 50 and/or support for filter media 10.

FIG. 6 is a perspective illustration of a filter assembly 60 that includes a plurality of filter elements 50 mounted to a tube sheet 62 in pairs in an end to end relationship. Tube sheet 62 separates the dirty air side from the clean air side of filter assembly 60. A cleaning system 64 for cleaning filter elements 50 with pulsed air includes a plurality of air nozzles 66 mounted to air supply pipes 68. Pulses of compressed air directed into interior conduit 58 of filter elements 50 are used to clean filter elements 50 of collected dirt and dust.

Figure 7:
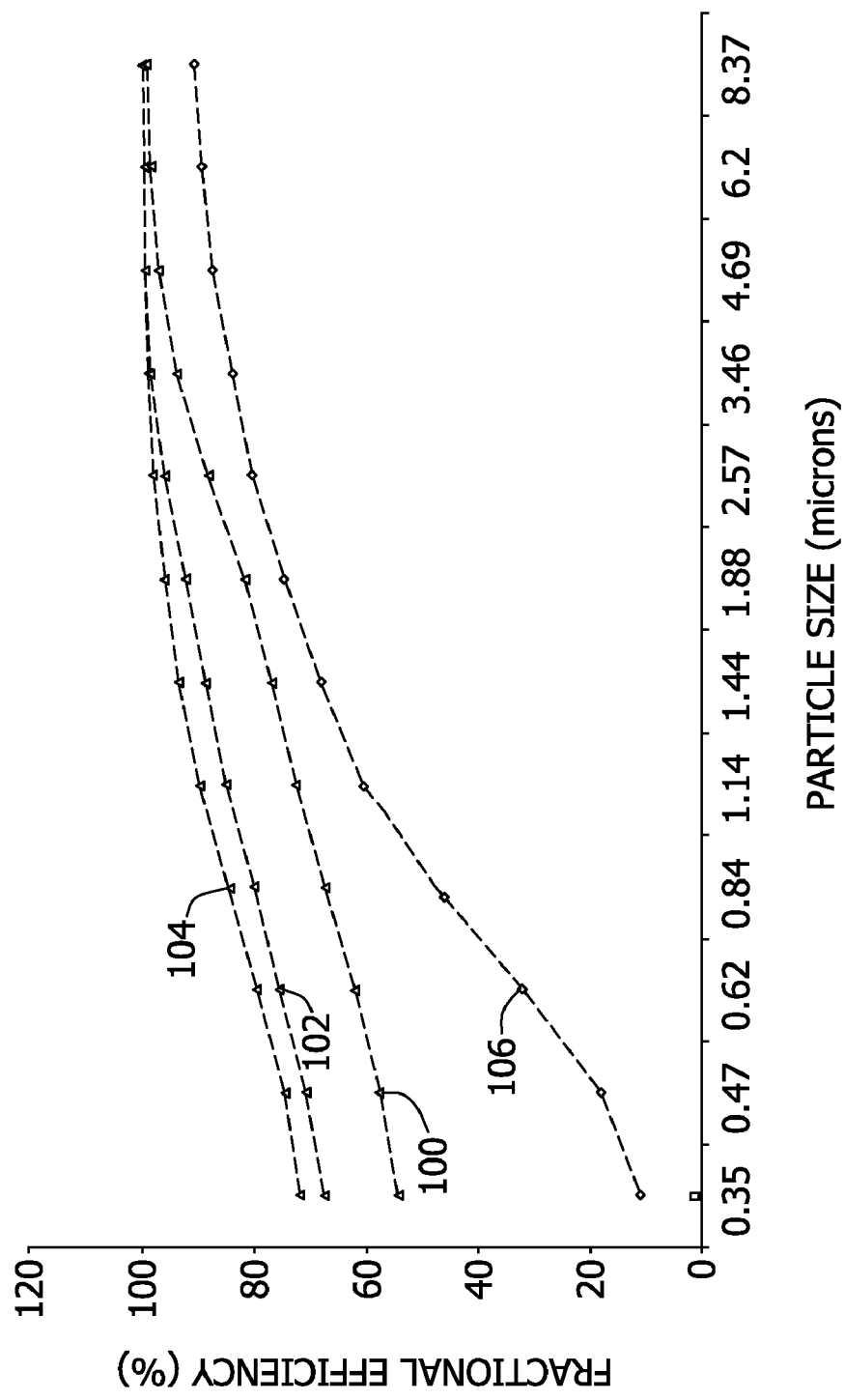
FIG. 7 is a graph of fractional efficiency versus particle size of base media substrates at various basis weights in accordance with an exemplary embodiment.

Flat sheets of base media substrate 12 test samples having various basis weights were compared to a comparative base media substrate in a flat sheet fractional efficiency test in accordance with ASHRAE 52.2-1999 test method. Air containing KCl particles was directed through each test sample at a flow rate of about 10 ft/min. FIG. 7 shows a graphical representation of the comparison test and the enhanced filtration efficiency performance of spunbond base media 12. Line 100 represents base substrate 12 at a basis weight of 150 g/m$^2$, line 102 represents base substrate 12 at a basis weight of 200 g/m$^2$, and line 104 represents base substrate 12 at a basis weight of 260 g/m$^2$. Line 106 represents a comparative base media substrate. The base media substrates did not include a nanofiber layer. Base media substrate 12 at each basis weight has a higher efficiency than the comparative base substrate over the entire range of particle sizes of the KCl particles.

Figure 8:
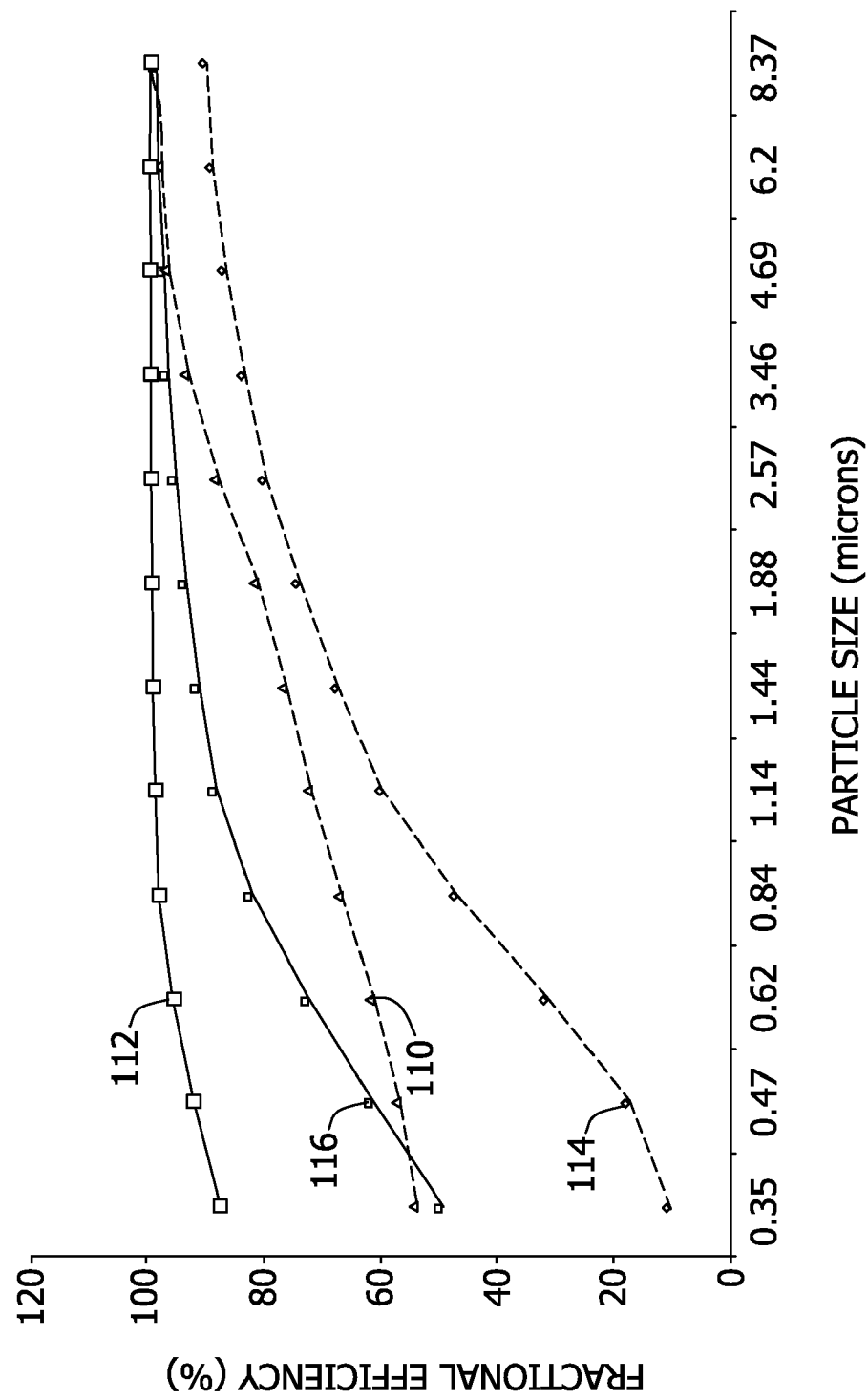
FIG. 8 is a graph of fractional efficiency versus particle size of base media substrates with and without a nanofiber layer in accordance with an exemplary embodiment compared to a comparative base media substrate with and without a nanofiber layer.

Flat sheets of base media substrate 12, and base media substrate 12 including nanofiber layer 20 were compared to a comparative base media substrate with and without a nanofiber layer in a flat sheet fractional efficiency test in accordance with ASHRAE 52.2-1999 test method. Air containing KCl particles was directed through each test sample at a flow rate of about 10 ft/min. FIG. 8 shows a graphical representation of the comparison test. Line 110 represents base media substrate 12 at 150 g/m$^2$, and line 112 represents base media substrate 12 at 150 g/m$^2$, including nanofiber layer 20. Line 114 represents a comparative base media substrate and line 116 represents the comparative base media substrate including a nanofiber layer. Base media substrate 12 with and without nanofiber layer 20 had a higher efficiency than the comparative base substrate with and without a nanofiber layer over the entire range of particle sizes of the KCl particles.

Figure 9:
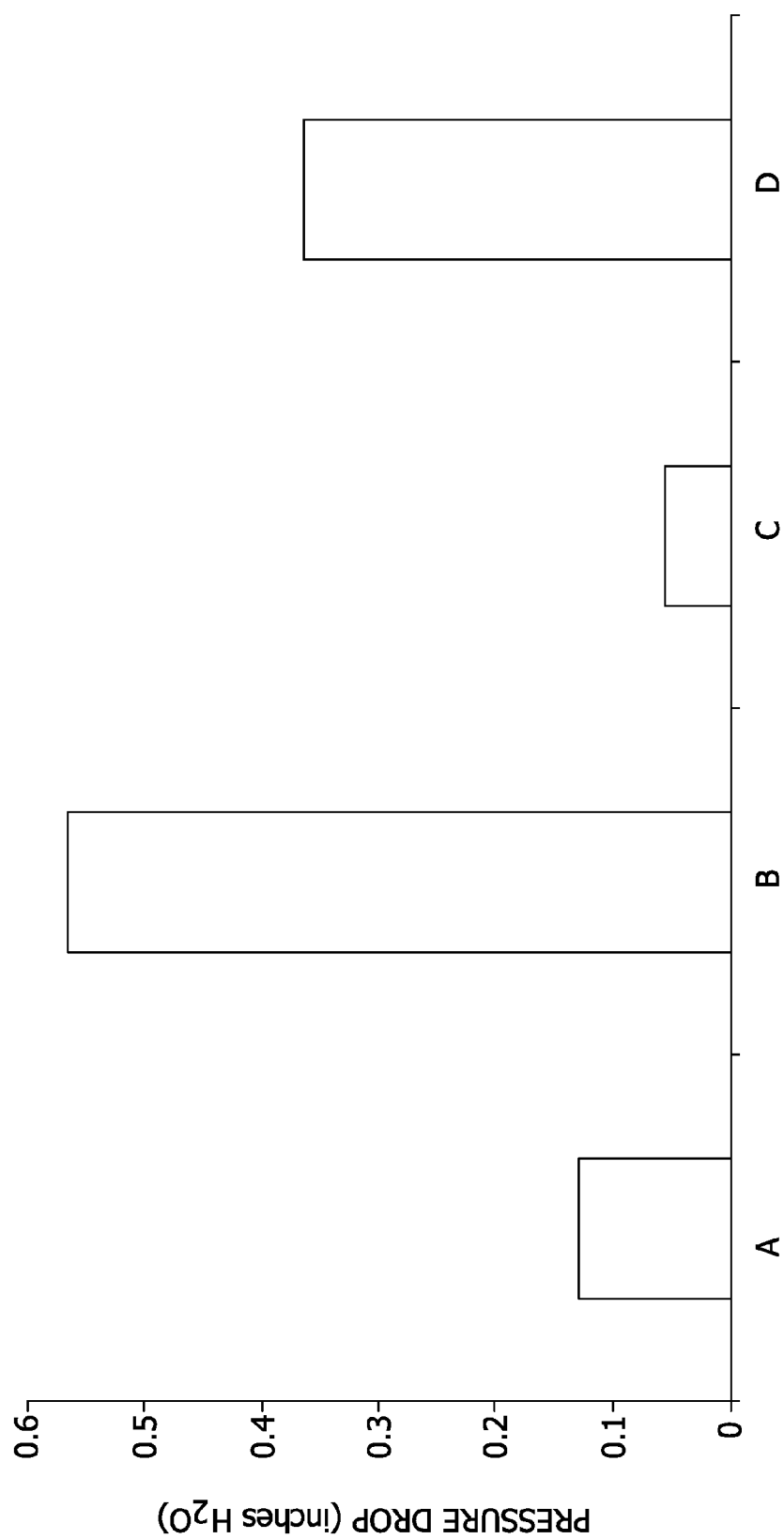
FIG. 9 is a bar graph of pressure drop versus base media substrate with and without a nanofiber layer in accordance with an exemplary aspect compared to a comparative base media substrate with and without a nanofiber layer.

Flat sheets of base media substrate 12, and base media substrate 12 including nanofiber layer 20 were compared to a comparative base media substrate with and without a nanofiber layer in a flat sheet pressure drop test in accordance with ASHRAE 52.2-1999 test method. Air containing KCl particles was directed through each test sample at a flow rate of about 10 ft/min. FIG. 9 shows a graphical representation of the comparison test. Bar A represents a comparative base media substrate and bar B represents the comparative base media substrate including a nanofiber layer. Bar C represents base media substrate 12 at 150 g/m$^2$, and bar D represents base media substrate 12 at 150 g/m$^2$, including nanofiber layer 20. Base media substrate 12 with and without nanofiber layer 20 had a lower pressure drop than the comparative base substrate with and without a nanofiber layer.

The above described filter elements 50 formed from filter media 10 can be used for filtering an air stream in almost any application, for example, for filtering gas turbine inlet air. The unique construction of filter media 10 is more durable than known filter media and provides for relatively lower pressure drop build-up because of less deflection from the forces exerted on the filter media during the filtering and reverse cleaning operations. Filter elements 50 can produce an average efficiency greater than about 75% capture of the most penetrating particle size of aerosol or dust (about 0.3 to about 0.4 micron) as compared to an efficiency of about 50-55% of known filter elements. Also, nanofiber layer 20 has a higher basis weight than known filter media which permits filter media 10 to clean down more effectively under reverse pulse cleaning than known filter media. Further, the high basis weight of nanofiber layer 20 provides for a durable three dimensional surface filtration layer which has an extensive tortuous path that permits high efficiency and fine particle capture without restricting air flow or increasing pressure drop.

The example filter media of Examples 1-2 and Comparative Examples 3-7 illustrate a comparison of embodiments of filter media 10 with known filter media. Efficiency, resistance and quality factor were measured for each filter media of Examples 1-2 and Comparative Examples 3-7. Efficiency was measured in accordance with ASHRAE 52.2-1999 test procedure, resistance was measured in accordance with EN-1822 (1998), and quality factor $Q_f$ was calculated as described above.

Example 1 is a spunbond polyester bicomponent fiber base media substrate, and Example 2 is the base media substrate of Example 1 plus a 2 g/m² nanofiber layer formed by an electro-blown spinning process. Comparative Example 3 is a known drylaid polyester base media substrate, and Comparative Example 4 is the known dry-laid polyester base media substrate of Comparative Example 3 plus a 2 g/m² nanofiber layer. Comparative Example 5 is a wet-laid synthetic paper plus a <0.5 g/m² nanofiber layer. Comparative Example 6 is a wet-laid synthetic paper, and Comparative Example 7 is the wet-laid synthetic paper of Example 6 plus a 20 g/m² meltblown fiber layer. The example results are shown in Table 1 below. When Example 2 is compared to composites in Comparative Examples 4, 5, and 7 efficiency is not sacrificed at the expense of reducing resistance which yields the associated high Quality Factor values.

TABLE I

| Example | Basis Weight (g/m²) | Efficiency (%) | Resistance (mm H₂O) | Quality Factor |
|---|---|---|---|---|
| Example 1 Spunbond Polyester Bicomponent Fiber Base | 158.6 | 57.0 | 1.78 | 525 |
| Example 2 Spunbond Polyester Bicomponent Fiber Base + 2 g/m² Nanofiber Layer | 154.6 | 80.2 | 3.43 | 534 |
| Comparative Example 3 Drylaid Polyester Base | 234.9 | 28.7 | 9.3 | 40 |
| Comparative Example 4 Drylaid Polyester Base + 2 g/m² Nanofiber Layer | 236.3 | 43.2 | 13.81 | 45 |
| Comparative Example 5 Wet laid Synthetic Paper + <0.5 g/m² Nanofiber Layer | 121.2 | 40.5 | 9.77 | 59 |
| Comparative Example 6 Wetlaid Synthetic Paper | 133.4 | 9.0 | 7.67 | 14 |
| Comparative Example 7 Wetlaid Synthetic Paper + 20 g/m² Meltblown Fiber Layer | 150.2 | 86.4 | 8.79 | 251 |

Efficiency measured at 0.3 microns, 5.3 cm/s face velocity (ASHRAE 52.2-1999).
Resistance measured in accordance with EN-1822 (1998).
Quality Factor defined by the equation: $Q_f = -25000 \cdot \log(P/100)/\Delta p$ This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A composite filter media structure comprising:
    a base substrate comprising a nonwoven synthetic fabric formed from a plurality of fibers with a spunbond process, said base substrate having a minimum filtration efficiency of about 50% capture of particles having a size of about 0.3 µm to about 0.4 µm, measured in accordance with ASHRAE 52.2-1999 test procedure, said base substrate having a resistance less than about 2.5 mm of water, measured in accordance with EN-1822 (1998), said nonwoven synthetic fabric comprises a bond area pattern comprising a plurality of substantially parallel discontinuous lines of bond area, each discontinuous line of bond area comprising a plurality of linear lines of bond area arranged end to end with a non bond area between each linear line of bond area; and
    a nanofiber layer deposited on one side of said base substrate, said composite filter media structure having a minimum filtration efficiency of about 75% capture of particles having a size of about 0.3 µm to about 0.4 µm, measured in accordance with ASHRAE 52.2-1999 test procedure.

2. A composite filter media structure in accordance with claim 1, wherein said base substrate and said nanofiber layer in combination are substantially electrically neutral.

3. A composite filter media structure in accordance with claim 1, wherein said plurality of fibers comprise a plurality of bicomponent fibers comprising a core material and a sheath material, said sheath material having a lower melting point than the core material.

4. A composite filter media structure in accordance with claim 1, wherein said nanofiber layer is formed by electro-blown spinning, electrospinning, centrifugal spinning, or melt blowing.

5. A composite filter media structure in accordance with claim 3, wherein said core material comprises at least one of polyester, polyamide, polyolefin, thermoplastic polyurethane, polyetherimide, polyphenyl ether, polyphenylene sulfide, polysulfone, and aramid.

6. A composite filter media structure in accordance with claim 1, wherein said base substrate has a basis weight of about 100 g/m² to about 300 g/m².

7. A composite filter media structure in accordance with claim 1, wherein said nanofiber layer comprises a plurality of nanofibers having an average diameter of about 500 nm or less, said nanofiber layer having a basis weight of about 0.6 g/m² to about 20 g/m².

8. A composite filter media structure in accordance with claim 1, wherein said nanofiber layer comprises a plurality of nanofibers having an average diameter of about 500 nm or less, said nanofiber layer having a basis weight of about 1.5 g/m² to about 2.5 g/m².

9. A composite filter media structure in accordance with claim 1, wherein said nonwoven synthetic fabric comprises a bond area of said spunbond fibers of about 10% to about 16% of an area of said fabric.

10. A composite filter media structure in accordance with claim 1, wherein said plurality of fibers comprise an average diameter of about 12 to about 25 microns.

11. A composite filter media structure in accordance with claim 1, wherein said composite filter media structure has a resistance less than about 4.0 mm of water, measured in accordance with EN-1822 (1998).

12. A composite filter media structure in accordance with claim 11, wherein a quality factor $Q_f$ of said composite filter media structure is greater than about 450.

13. A composite filter media structure in accordance with claim 11, wherein a quality factor $Q_f$ of said composite filter media structure is greater than about 500.

14. A filter element comprising a first end cap, a second end cap, and a composite filter media structure, the composite filter media structure comprising:
 a base substrate comprising a nonwoven synthetic fabric formed from a plurality of fibers with a spunbond process, said base substrate having a minimum filtration efficiency of about 50% capture of particles having a size of about 0.3 µm to about 0.4 µm, measured in accordance with ASHRAE 52.2-1999 test procedure, said base substrate having a resistance less than about 2.5 mm of water, measured in accordance with EN-1822 (1998), said nonwoven synthetic fabric comprises a bond area pattern comprising a plurality of substantially parallel discontinuous lines of bond area, each discontinuous line of bond area comprising a plurality of linear lines of bond area arranged end to end with a non bond area between each linear line of bond area; and
 a nanofiber layer deposited on one side of said base substrate, said composite filter media structure having a minimum filtration efficiency of about 75% capture of particles having a size of about 0.3 µm to about 0.4 µm, measured in accordance with ASHRAE 52.2-1999 test procedure.

15. A filter element in accordance with claim 14, wherein said base substrate and said nanofiber layer in combination are substantially electrically neutral.

16. A filter element in accordance with claim 14, wherein said plurality of fibers comprise a plurality of bicomponent fibers comprising a core material and a sheath material, said sheath material having a lower melting point than the core material.

17. A filter element in accordance with claim 14, wherein said nanofiber layer is formed by electro-blown spinning, electrospinning, centrifugal spinning, or melt blowing.

18. A filter element in accordance with claim 16, wherein said core material comprises at least one of polyester, polyamide, polyolefin, thermoplastic polyurethane, polyetherimide, polyphenyl ether, polyphenylene sulfide, polysulfone, and aramid.

19. A filter element in accordance with claim 14, wherein said base substrate has a basis weight of about 100 g/m² to about 300 g/m².

20. A filter element in accordance with claim 14, wherein said nanofiber layer comprises a plurality of nanofibers having an average diameter of about 500 nm or less, said nanofiber layer having a basis weight of about 0.6 g/m² to about 20 g/m².

21. A filter element in accordance with claim 14, wherein said nanofiber layer comprises a plurality of nanofibers having an average diameter of about 500 nm or less, said nanofiber layer having a basis weight of about 1.5 g/m² to about 2.5 g/m².

22. A filter element in accordance with claim 14, wherein said nonwoven synthetic fabric comprises a bond area of said spunbond fibers of about 10% to about 16% of an area of said fabric.

23. A filter element in accordance with claim 14, wherein said plurality of fibers comprise an average diameter of about 12 to about 25 microns.

24. A filter element in accordance with claim 14, wherein said composite filter media structure has a resistance less than about 4.0 mm of water, measured in accordance with EN-1822 (1998).

25. A filter element in accordance with claim 24, wherein a quality factor $Q_f$ of said composite filter media structure is greater than about 450.

26. A filter element in accordance with claim 14, wherein said composite filter media structure further comprises a plurality of pleats.

\* \* \* \* \*